US008639933B2

(12) United States Patent
Masui

(10) Patent No.: US 8,639,933 B2
(45) Date of Patent: Jan. 28, 2014

(54) IMAGE READING APPARATUS, ELECTRONIC DOCUMENT GENERATION METHOD, AND STORING MEDIUM STORING ELECTRONIC DOCUMENT GENERATION PROGRAM

(75) Inventor: Takanori Masui, Kanagawa (JP)

(73) Assignee: Fuji Xeroc Co., Ltd., Tokyo (JP)

( * ) Notice: Subject to any disclaimer, the term of this patent is extended or adjusted under 35 U.S.C. 154(b) by 1721 days.

(21) Appl. No.: 11/450,262

(22) Filed: Jun. 12, 2006

(65) Prior Publication Data

US 2007/0150739 A1 Jun. 28, 2007

(30) Foreign Application Priority Data

Dec. 22, 2005 (JP) ................. 2005-370070

(51) Int. Cl.
*H04L 9/32* (2006.01)
*H04L 29/06* (2006.01)
*G06F 7/04* (2006.01)
*G06F 15/16* (2006.01)
*G06F 17/30* (2006.01)

(52) U.S. Cl.
USPC ............... 713/178; 713/176; 713/180; 726/5; 358/1.14; 358/1.15

(58) Field of Classification Search
USPC ................ 713/176, 178, 180; 358/1.14, 1.15; 726/5
See application file for complete search history.

(56) References Cited

U.S. PATENT DOCUMENTS

| 5,748,738 A * | 5/1998 | Bisbee et al. ................. 713/176 |
| 6,299,062 B1 * | 10/2001 | Hwang ......................... 235/379 |
| 6,486,008 B1 | 11/2002 | Lee |
| 6,587,945 B1 * | 7/2003 | Pasieka ........................ 713/176 |
| 6,889,324 B1 * | 5/2005 | Kanai et al. .................. 713/176 |
| 6,912,660 B1 * | 6/2005 | Petrogiannis ................ 713/181 |
| 6,918,042 B1 * | 7/2005 | Debry ............................. 726/5 |
| 6,959,387 B2 * | 10/2005 | Walker et al. ................ 713/178 |
| 7,002,700 B1 * | 2/2006 | Motamed ..................... 358/1.1 |
| 7,142,690 B2 * | 11/2006 | Hyakutake et al. .......... 382/100 |
| 7,458,510 B1 * | 12/2008 | Zhou ............................ 235/381 |
| 7,672,003 B2 * | 3/2010 | Dowling et al. ............. 358/1.15 |
| 2002/0019938 A1 * | 2/2002 | Aarons ......................... 713/168 |
| 2002/0025604 A1 | 2/2002 | Tiwari |
| 2002/0113264 A1 | 8/2002 | Horikoshi et al. |
| 2003/0103250 A1 * | 6/2003 | Kidokoro et al. ............. 358/524 |
| 2003/0184803 A1 * | 10/2003 | Yamada et al. .............. 358/1.16 |
| 2005/0250286 A1 | 11/2005 | Paik |
| 2005/0283611 A1 * | 12/2005 | Wang et al. .................. 713/176 |
| 2006/0072144 A1 * | 4/2006 | Dowling et al. ............. 358/1.15 |

(Continued)

FOREIGN PATENT DOCUMENTS

| CN | 1202288 A | 12/1998 |
| CN | 1449181 A | 10/2003 |

(Continued)

*Primary Examiner* — Edan Orgad
*Assistant Examiner* — Kari Schmidt
(74) *Attorney, Agent, or Firm* — Oliff & Berridge, PLC

(57) ABSTRACT

An image reading apparatus which reads an original document and generates a digitized scanned document, and which includes a document storage section that stores the scanned document, a document bundling section that identifies one or more scanned documents stored by the document storage section, and bundles the identified documents into one document, and a time stamp affixing section that creates a digital signature of the document bundled by the document bundling section, and affixes a time stamp.

9 Claims, 4 Drawing Sheets

(56) References Cited

U.S. PATENT DOCUMENTS

2006/0203279 A1* 9/2006 Kinoshita ................ 358/1.14
2006/0244035 A1   11/2006 Bojarczuk et al.
2007/0074028 A1*  3/2007 Makishima et al. .......... 713/176

FOREIGN PATENT DOCUMENTS

| EP | 1 667 214 A1 | 6/2006 |
| JP | A 2003-244139 | 8/2003 |
| WO | WO 03/103057 A1 | 12/2003 |

* cited by examiner

1) PROCESSING START CONDITION
   NOVEMBER 28, 2005
       21 : 00
2) PROCESSING OBJECT DOCUMENT
       ALL DOCUMENTS IN SCANNED
   DOCUMENT STORAGE REGION
3) BINDING INSTRUCTION
       GIVEN
4) STORAGE LOCATION
   DOCUMENT MANAGEMENT SERVER

1) PROCESSING START CONDITION
       NUMBER OF DOCUMENTS
   ACCUMULATED IN SCANNED DOCUMENT
   STORAGE REGION : 10 DOCUMENTS OR OVER
2) PROCESSING OBJECT DOCUMENT
       ALL DOCUMENTS IN SCANNED
       DOCUMENT STORAGE REGION
3) BINDING INSTRUCTION
       GIVEN
4) STORAGE LOCATION
   SCANNED DOCUMENT STORAGE REGION

1) PROCESSING START CONDITION
       TOTAL SIZE OF DOCUMENTS
   ACCUMULATED IN SCANNED DOCUMENT
   STORAGE REGION : OVER 1MB
2) PROCESSING OBJECT DOCUMENT
       ALL DOCUMENTS IN SCANNED
   DOCUMENT STORAGE REGION
3) BINDING INSTRUCTION
       NOT GIVEN
4) STORAGE LOCATION
   SUBMISSION BOX

1) PROCESSING START CONDITION
       MANUAL (OPERATOR INSTRUCTION)
2) PROCESSING OBJECT DOCUMENT
       FILE NAME :
       A- * *
3) BINDING INSTRUCTION
       GIVEN
4) STORAGE LOCATION
   DOCUMENT MANAGEMENT SERVER

FIG.2

IMAGE READING APPARATUS, ELECTRONIC DOCUMENT GENERATION METHOD, AND STORING MEDIUM STORING ELECTRONIC DOCUMENT GENERATION PROGRAM

BACKGROUND

1. Technical Field

The present invention relates to an image reading apparatus, an electronic document generation method, and storing medium storing electronic document generation program, and relates to an art for affixing a time stamp to an electronic document of which authentication is requested.

2. Related Art

Conventionally, the image reading apparatus having an digital signing section (such apparatus is hereinafter to be called the scanner) has execute digital signing processing and time stamping processing for each particular scanned image.

By the e-Document Law (formerly "Summary of the Law Governing the Use of Information and Communications Technology in the Preservation of Documents that Private Businesses Perform") enforced in Japan on Apr. 1, 2005, it has been made possible to provide electronic documents of which authentication is requested, while, in generation thereof, it has been necessary to affix a time stamp.

Such time stamping processing is charged, and every time the time stamping processing is executed, a tariff is imposed.

SUMMARY

According to an aspect of the invention, there is provided an image reading apparatus which reads an original document and generates a digitized scanned document, and which includes a document storage section that stores the scanned document, a document bundling section that identifies one or more scanned documents stored by the document storage section, and bundles the identified documents into one document, and a time stamp affixing section that creates a digital signature of the document bundled by the document bundling section, and affixes a time stamp.

BRIEF DESCRIPTION OF THE DRAWINGS

An embodiment of the present invention will be described in detail based on the following figures, in which:

FIG. 2 is a drawing giving an example of instruction document written for time stamping processing in the time shift mode;

DETAILED DESCRIPTION

An embodiment of the image reading apparatus, the electronic document generation method, and storing medium storing electronic document generation program, of the present invention, will be described with reference to the attached drawings.

Figure 1:
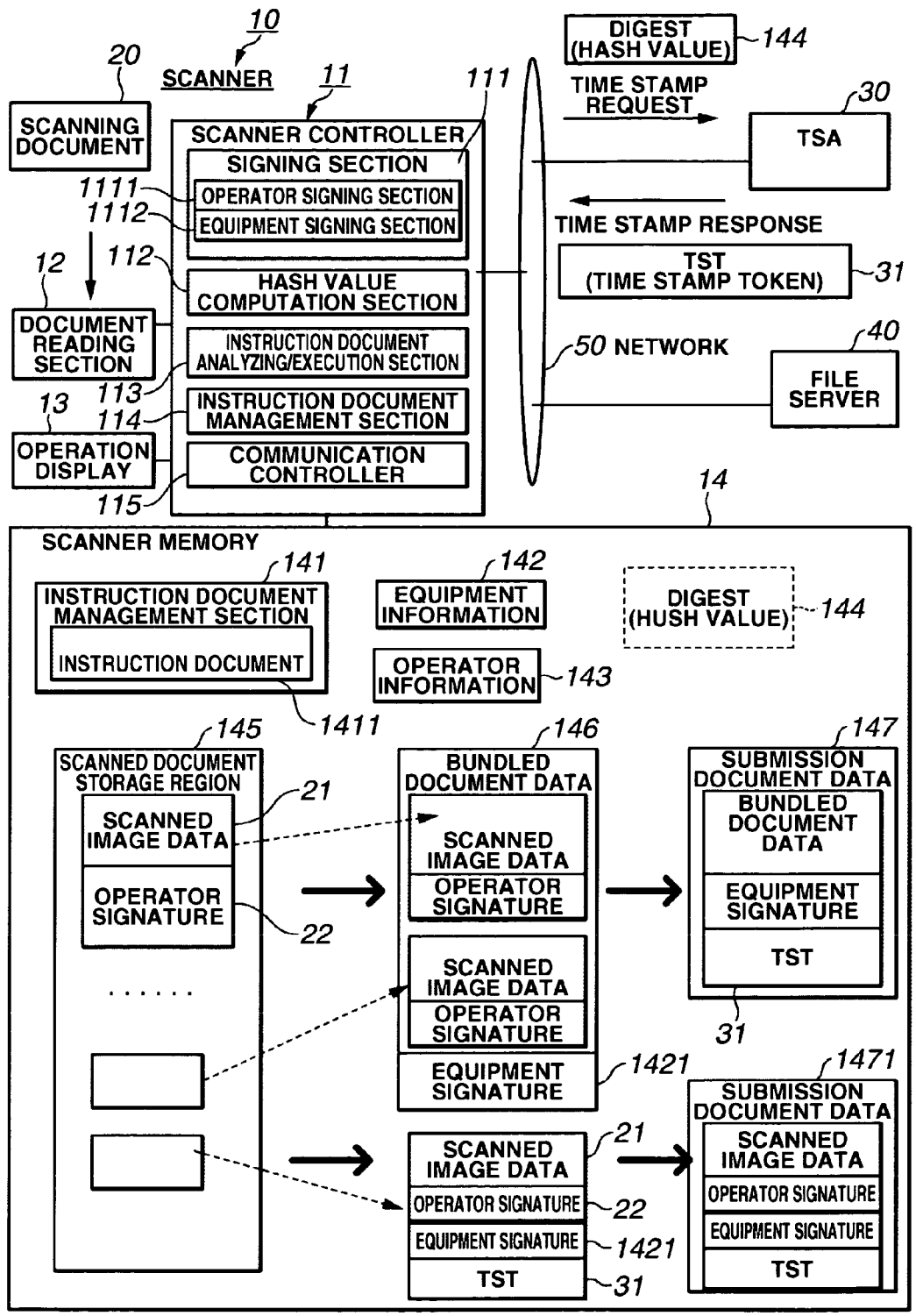
FIG. 1 is a block diagram giving an example of the electronic document generation method including the scanner of the present invention.

FIG. 1 is a block diagram illustrating the functional configuration of a scanner 10 for executing time stamping processing for generation of submission data for the scanned document, and an example of the configuration of an electronic document generation system including the scanner 10.

In FIG. 1, the scanner 10 executes digitally signing for scanned image data 21 read from a scanning document 20.

In addition, the scanner 10 has the time stamping function which acquires a TST (Time Stamp Token) 31 from a TSA (Time Stamping Authority) 30 connected through a network 50 as a process for allowing checking to see that the scanned image data 21 had existed prior to a specific point of time, and that electronic document has not been falsified, and generates submission document data 147 by affixing the TST to the scanned document as the object of the time stamping processing.

Further, the time stamping function provides the mode in which the conventional time stamping processing is carried out, i.e., time stamping processing is carried out for each piece of scanned image data 21 read by a document reading section 12, and the mode in which time stamping processing is carried out for document data 146 obtained by connecting and bundling plural pieces of scanned image data 21 into a piece of data.

Besides these, two other modes are available; the real time mode in which time stamping processing is executed immediately after the reading processing for the scanning document 20 is carried out by the document reading section 12, and the time shift mode in which time stamping processing is executed, being time-shifted to a desired time and date after the time and date when the reading processing for the scanning document 20 was carried out by the document reading section 12.

As a configuration for executing the above-mentioned time stamping processing for the scanning document 20, the scanner 10 has a scanner controller 11 which controls the entire scanner 10, a Scanner memory 14, the document reading section 12, and an Operation display 13.

The document reading section 12 converts the image of the scanning document 20 read into digital image data for outputting it to the scanner controller 11.

The Operation display 13 comprises a display which displays the operation screen for the scanner 10, a functional pushbutton for instructing the system to start scanning processing, and pushbuttons, such as ten keys, directional keys, and the like, for executing selection operation from the items on the operation screen, and inputting for the parameters.

The scanner controller 11 provides the function blocks which are: a signing section 111 which create a digital signature (signing by the operator, and signing by the scanner equipment) for the scanned image data 21 read by the document reading section 12 on the basis of the digital certificate which has been issued by an official authentication agency; a hash value computation section 112 which generates a digest of the scanned image data 21 or the bundled document data 146, which is a bundle of pieces of scanned image data 21, as the object in executing time stamping processing; an instruction document management section 114 which registers an instruction document 1411 for executing time stamping processing with a time shift in the Scanner memory 14 for management; an instruction document analyzing/execution section 113 which monitors the arrival of the time and date of the processing start on the basis of the processing start condition given in the instruction document 1411 registered, and execute jobs, such as extraction of the processing object document specified in the instruction document 1411, bundling processing, and the like; and a Communication controller 115 which carries out data communication control for acquiring the TST 31 from the TSA 30 connected through the network 50 under the time stamping protocol, or file transfer processing for storing the submission document data 147 generated by executing the time stamping processing in an apparatus other than the scanner 10, for example, the file server 40 which manages the submission document data 147.

The Scanner memory 14 includes an instruction document management section 141 which stores and manages each particular instruction document 1411 in which the procedure for the scanner 10 for generating the submission document data 147 and the time and date of the execution of the generation processing thereof; equipment information 142 which includes the digital certificate and private key for creating the equipment signature using the private key corresponding to the digital certificate issued equipment-specifically for the scanner; operator information 143 which includes the digital certificate for the digital signature issued for the operator for the read data for the scanning document 20 read by the document reading section 12, and the private key corresponding thereto, and the identification information about the operator; a digest 144 which is a hash value to be used in time stamping processing that has been calculated by the computation section 112 with the hash function; a scanned document storage region 145 which provides the storage region for the scanned image data 21 which has been read by the document reading section 12 and to which the operator signature 22 of the operator has been affixed; bundled document data 146 which has been bundled when plural processing object documents are given in executing the time stamping processing, providing intermediate data before the TST 31 being affixed thereto; bundled document data 146 to which the TST 31 has been affixed; and the submission document data 147 including the scanned image data 21.

FIG. 2 is a drawing illustrating the contents of the instruction document 1411 as given in FIG. 1.

The information given in the instruction document 1411 is: the "processing start condition" information which provides the condition for starting the time stamping processing; the "processing action document" information which provides the extraction condition for specifying the object document for the time stamping processing; the "binding instruction" information which provides instruction information about whether, in time stamping processing, the time stamp token is to be affixed to the individual, respective documents, or a prescribed unit of plural scanned documents are to be bundled before affixing the time stamp token; and the "storage location" information which provides information specifying the storage location for the submission document 147 to which the time stamp token has been affixed.

As the "processing start condition" information in the instruction document 1411, the time and date at which the time stamping processing is to be started, or the time, day, or day of week on which it is periodically and repetitively executing is given, and besides this, for example, a prescribed number of pieces of scanned image data 21 accumulated in the scanned document storage location 145 beyond which the time stamping processing with the contents in the instruction document 1411 is to be started is given, or a prescribed reference value of the total data size of the scanned image data 21 accumulated in the scanned document storage location 145 beyond which the time stamping processing is to be started is given.

In addition, instead of setting the starting condition for time stamping processing as mentioned above, the detection of the processing starting action by the operator in the Operation display 13 may be specified as the processing start condition.

In addition, setting registration of this instruction document 1411 to the scanner 10 is carried out by the setting operation from an external apparatus cable-connected to the scanner 10, or from a setting tool activated by an external apparatus, such as a PC, or the like, connected through the network 50, or by the setting operation from the registration operation screen displayed by the Operation display 13.

Figure 3:
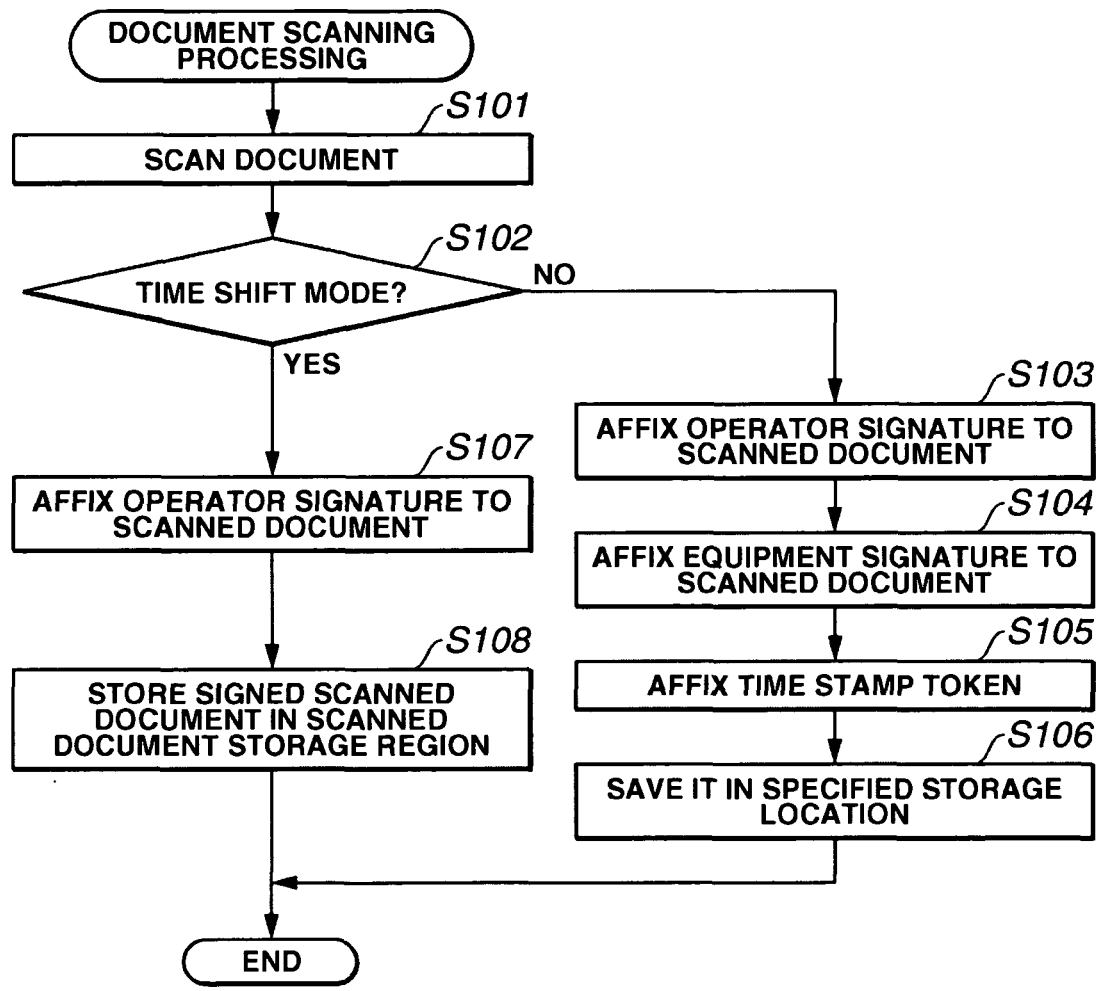
FIG. 3 is a flowchart illustrating an example of operation for document scanning processing.

Next, an example of the operation of document scanning processing by the scanner 10 will be illustrated in the flowchart as shown in FIG. 3 for explanation.

In FIG. 3, the scanner 10 detects a reading instruction operation for the scanning document 20 in the Operation display 13, and carries out reading processing for the scanning document 20 by the document reading section 12 (S101).

The scanner 10 determines whether the operation mode is the "time shift mode" (S102), and when it is not the time shift mode (NO at S102), affixes the operator signature 22 generated with the use of the private key of the operator stored in the operator information 143 to the scanning document 20 by the signing section 111 (S103); then, the scanner 10 further affixes the equipment signature 1421 (S104), and further affixes the TST 31 (S105). Equipment signing is carried out using the equipment signature of the scanner 10 that is stored in the equipment information 142. In addition, the signing times for the operator signature 22 of the operator and the equipment signature 1421 are recorded with the use of the internal clock of the scanner 10, however, by the time stamp later affixed to the scanning document, the authentication about the existence of the scanned document at the time point of the time stamp affixing, and the operator signature and the equipment signature having been given before the time point of the time stamping is ensured.

Alternatively to register the private key required for the operator signature (digital signature by the operator) to the operator information 143 in the scanner 10, the system may be adapted such that an IC card reader is connected to the scanner 10, and the IC card of the operator is used for creating the digital signature.

And, the generated submission document data 1471 (with no bundling processing made) is saved in the specified storage location (S106).

Again, the scanner 10 returns to step S102 for determination processing, and when the operation mode is the "time shift mode" (YES at S102), the scanner 10 affixes the operator signature 22 which has been generated using the private key recorded in the operator information 143, to the scanned image data 21 (S107), saving it in the scanned document storage region 145 (S108).

Herein, the program has been created such that, when the operation mode is the "time shift mode", the equipment signature is not affixed here, but later when the scanned documents are bundled for affixing the time stamp, equipment signing is carried out, however, the program may, of course, be adapted such that equipment signing is carried out for each scanned document.

Figure 4:
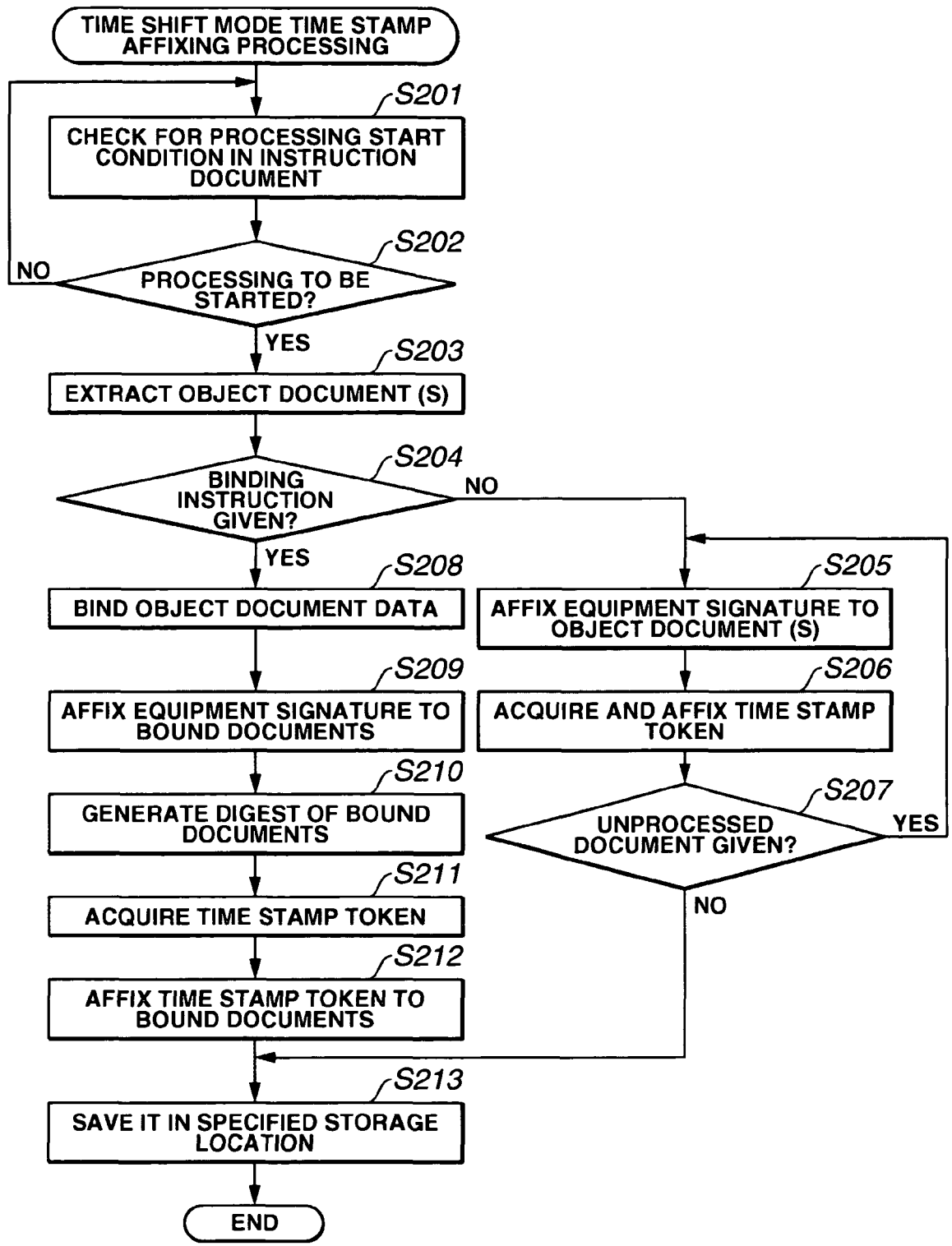
FIG. 4 is a flowchart illustrating the operation for time stamping processing in the time shift mode.

Next, the operation when the scanner 10 carries out time stamping processing of the scanned image data 21 saved in the scanned document storage region 145 in the "time shift mode" on the basis of the contents as described in the instruction document 141 will be illustrated in the flowchart as shown in FIG. 4 for explanation.

The scanner 10 reads the "processing start condition" information given in the instruction document 1411 stored in the instruction document management section 141 for management, and determines whether the processing is to be started (S201).

When the processing start condition is met (YES at S202), the scanner 10 analyzes the contents of the "processing object document" information given in the instruction document

1411 by the instruction document analyzing/execution section 113, and on the basis of the extraction condition, identifies the scanned image data 21 which is to be subjected to the time stamping processing, having the operator signature 22 affixed, in the scanned document storage region 145 (S203).

Next, the "binding instruction" information given in the instruction document 1411 is analyzed to determine whether plural pieces of scanner image data 21 that are the processing objects of the time stamping are to be bound as a bundle (S204).

When a "binding instruction" is not given (NO at S204), the scanner 10 affixes the equipment signature to each of the object documents identified at step S203 (S205), which is followed by acquiring the time stamp token and affixing it (S206), and repeats this processing of generating submission document data 147 for all the object documents (YES at S207).

When, for all the documents, equipment signing and time stamping processing have been completed (NO at S207), the scanner 10 carries out file transfer processing in order to store the generated submission document data 147 in the previously specified storage location in the Scanner memory 14, or in the storage apparatus of the network-connected file server 40 (S213).

Again, the scanner 10 returns to step S204, and when the instruction document 1411 provides a "binding instruction" (YES at S204), the scanner 10 bundles the documents as the processing objects that have been retrieved from the scanned document storage region 145. At this time, especially when the order of bundling has been specified in the instruction document 1411, the scanner 10 carries out the bundling processing in accordance with the specification for generation of bundled document data 146 (S208); affixes the equipment signature to the bundled document data 146 generated (S209); and by the hash value computation section 112, generates a digest 144 for the bundled document data 146 to which the equipment signature has been affixed (S210).

The scanner 10 sends the generated digest 144 to the TSA 30 under the time stamping protocol to acquire the TST 31 (S211), and generates a submission document data 147 by affixing the acquired TST 31 to the bundled document data 146 to which the equipment signature has been affixed (S212).

Next, the scanner 10 reads the "storage location" information in the instruction document 1411, and stores the submission document data 147 in the specified storage location, completing the processing (S213).

The foregoing description of the embodiment of the present invention has been provided for the purpose of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling other skilled in the art to understand the invention for various embodiments and with the various modifications as are suited to the particular use contemplated. It is intended that the scope of the invention be defined by the following claims and their equivalents.

The entire disclosure of Japanese Patent Application No. 2005-370070 filed on Dec. 22, 2005 including specification, claims, drawings and abstract is incorporated herein by reference in its entirety.

What is claimed is:

1. An image reading apparatus that reads an original document and generates a digitized scanned document, comprising:
    a document storage section that stores the scanned document, each scanned document stored in the document storage section including a digital signature of an operator of the image reading apparatus generated with the use of a private key of the operator of the image reading apparatus,
    a document bundling section that, when a total data size of the scanned documents stored in the document storage section exceeds a specific data size, identifies and bundles two or more scanned documents stored in the document storage section and including the digital signature of the operator of the image reading apparatus, and generates a new document having the two or more scanned documents identified and bundled,
    a signing section that creates a digital signature of the image reading apparatus based on a digital certificate issued for the image reading apparatus for the new document and adds the created signature to the new document,
    a time stamp affixing section that acquires a time stamp for the new document, and affixes the acquired time stamp to the new document, and
    a process start condition management section that manages the start of the process.

2. The image reading apparatus of claim 1, wherein the start of the process managed by the process start condition management section is given in a stored instruction document.

3. The image reading apparatus of claim 2, wherein the document bundling section identifies the scanned documents to be bundled based on the stored instruction document.

4. The image reading apparatus of claim 1, further comprising:
    a hash value computation section that generates a digest of the bundled document data.

5. An electronic document generation method, comprising:
    storing a scanned document, including a digital signature of an operator of an image reading apparatus used to scan the document and generated with the use of a private key of the operator of the image reading apparatus and, in a document storage section,
    when a total data size of the scanned documents stored in the document storage section exceeds a specific data size, identifying and bundling two or more scanned documents stored in the document storage section and including the digital signature of the operator of the image reading apparatus, and generating a new document having the two or more scanned documents identified and bundled,
    creating a digital signature of the image reading apparatus based on a digital certificate issued for the image reading apparatus for the new document and adding the created signature to the new document,
    acquiring a time stamp for the new document, and affixing the acquired time stamp to the new document, and
    managing the start of the process.

6. A non-transitory computer readable medium storing a program causing a computer to execute an electronic document generation process in an image reading apparatus that reads an original document and generates a digitized scanned document, the process comprising:

storing a scanned document, including a digital signature of an operator of an image reading apparatus used to scan the document and generated with the use of a private key of the operator of the image reading apparatus and, in a document storage section, when a total data size of the scanned documents stored in the document storage section exceeds a specific data size, identifying and bundling two or more scanned documents stored in the document storage section and including the digital signature of the operator of the image reading apparatus, and generating a new document having the two or more scanned documents identified and bundled, creating a digital signature of the image reading apparatus based on a digital certificate issued for the image reading apparatus for the new document and adding the created signature to the new document, acquiring a time stamp for the new document, and affixing the acquired time stamp to the new document, and managing the condition for the start of the process.

7. An image reading apparatus that reads an original document and generates a digitized scanned document, comprising:

a document storage section that stores the scanned document, each scanned document stored in the document storage section including a digital signature of an operator of the image reading apparatus, a document bundling section that, when a total data size of the scanned documents stored in the document storage section exceeds a specific data size, identifies and bundles two or more scanned documents stored in the document storage section and including the digital signature of the operator of the image reading apparatus, and generates a new document having the two or more scanned documents identified and bundled, a signing section that creates a digital signature of the image reading apparatus for the new document and adds the created signature to the new document, a time stamp affixing section that acquires a time stamp for the new document, and affixes the acquired time stamp to the new document, and a process start condition management section that manages the condition for the start of the process.

8. An electronic document generation method, comprising:

storing a scanned document, including a digital signature of an operator of an image reading apparatus used to scan the document, in a document storage section, when a total data size of the scanned documents stored in the document storage section exceeds a specific data size, identifying and bundling two or more scanned documents stored in the document storage section and including the digital signature of the operator of the image reading apparatus, and generating a new document having the two or more scanned documents identified and bundled, creating a digital signature of the image reading apparatus for the new document and adding the created signature to the new document, acquiring a time stamp for the new document, and affixing the acquired time stamp to the new document, and managing the start of the process.

9. A non-transitory computer readable medium storing a program causing a computer to execute an electronic document generation process in an image reading apparatus that reads an original document and generates a digitized scanned document, the process comprising:

storing a scanned document, including a digital signature of an operator of an image reading apparatus used to scan the document, in a document storage section, when a total data size of the scanned documents stored in the document storage section exceeds a specific data size, identifying and bundling two or more scanned documents stored in the document storage section and including the digital signature of the operator of the image reading apparatus, and generating a new document having the two or more scanned documents identified and bundled, creating a digital signature of the image reading apparatus for the new document and adding the created signature to the new document, acquiring a time stamp for the new document, and affixing the acquired time stamp to the new document, and managing the start of the process.

* * * * *